Inventors:
Orville Ingram
Walter L. Floehr

By Wilmer Mechlin
their Attorney

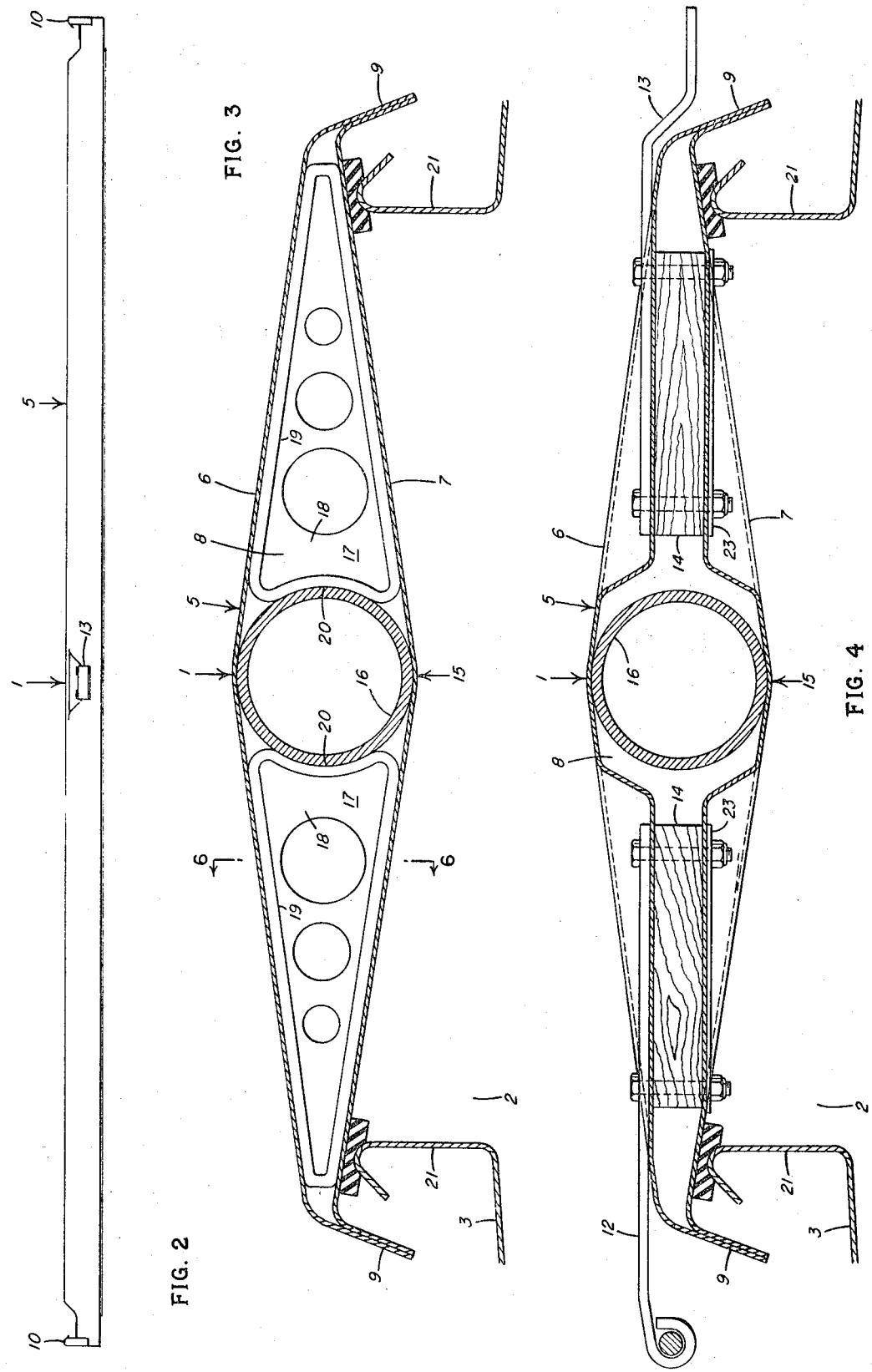

United States Patent Office 3,543,442
Patented Dec. 1, 1970

3,543,442
REINFORCED FIBER GLASS HATCH COVER
Orville Ingram and Walter L. Floehr, Toledo, Ohio, assignors to Midland-Ross Corporation, Cleveland, Ohio, a corporation of Ohio
Filed Dec. 20, 1968, Ser. No. 785,570
Int. Cl. E06b 3/00
U.S. Cl. 49—501
11 Claims

ABSTRACT OF THE DISCLOSURE

A hollow fiber glass hatch cover for a roof hatch of a covered railway hopper car formed of upper and lower fiber glass panels internally reinforced longitudinally by a center, longitudinally extending fiber glass tube and laterally by longitudinally spaced pairs of laterally extending fiber glass ribs bonded to the panel and embracing the central tube, with end blocks fitting in and bonded to the ends of the tube providing internal end stiffening.

BACKGROUND OF THE INVENTION

The copending Ingram application Ser. Nos. 746,787, filed July 23, 1968 and 759,856, filed Sept. 16, 1968, disclose reinforced fiber glass hatch covers, which, in possessing not only lightness in weight but also adequate stiffness and resistance to cracking, solve the problems theretofore confronted in attempting to replace the previous heavy steel hatch covers with lightweight fiber glass hatch covers readily manageable by one operator. In its reinforced fiber glass hatch cover, the present invention affords another solution to these problems.

SUMMARY OF THE INVENTION

The primary object of the present invention is to provide an improved hatch cover for roof hatches of railway hopper cars which has a hollow body reinforced both longitudinally and laterally by internal fiber glass reinforcement.

Another object of the invention is to provide a fiber glass hatch cover wherein for increased strength internal end stiffeners are unitized with an internal central fiber glass tube responsible for longitudinal reinforcement.

Attaining the foregoing objects, the preferred embodiment of improved fiber glass hatch cover of the present invention has a hollow body formed of separately molded upper and lower fiber glass panels and features an internal reinforcing structure having for longitudinal reinforcement a central fiber glass tube extending substantially the length of and centered laterally on the body and for lateral reinforcement a plurality of longitudinally spaced pairs of laterally extending fiber glass ribs, each pair of which embraces or engages and outstands from opposite sites of the central tube. For further strengthening, internal end blocks backing rain deflectors are unitized with the central tube by being fitted in slots in and bonded to ends thereof. The unitizing of the end blocks and tube also facilitates the locating of these parts during assembly and, if desired, may be extended to include preliminary bonding of the reinforcing ribs to the tube so that the whole reinforcing structure can be assembled as a preassembled unit with the top and bottom panels.

Other objects and features of the invention will appear hereinafter in the detailed description, be particularly pointed out in the appended claims and be illustrated in the accompanying drawings, in which:

FIGURE DESCRIPTION

FIG. 2 is a side elevation view on an enlarged scale of the hatch cover removed from the roof;

FIG. 3 is a fragmentary vertical sectional view on an enlarged scale, taken along lines 3—3 of FIG. 1;

FIG. 4 is a fragmentary vertical sectional view on the scale of FIG. 3, taken along lines 4—4 of FIG. 1;

DESCRIPTION

Figure 1:
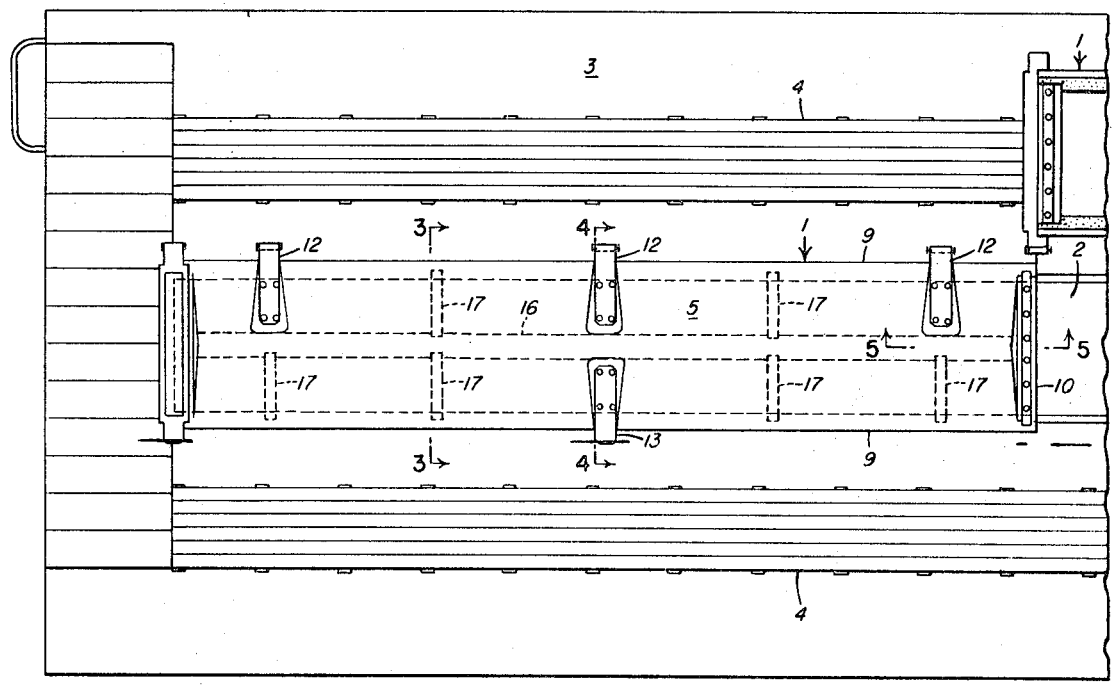
FIG. 1 is a fragmentary plan view on an installation of a preferred embodiment of the improved hatch cover of the present invention on a roof of a covered railway hopper car.
Figure 5:
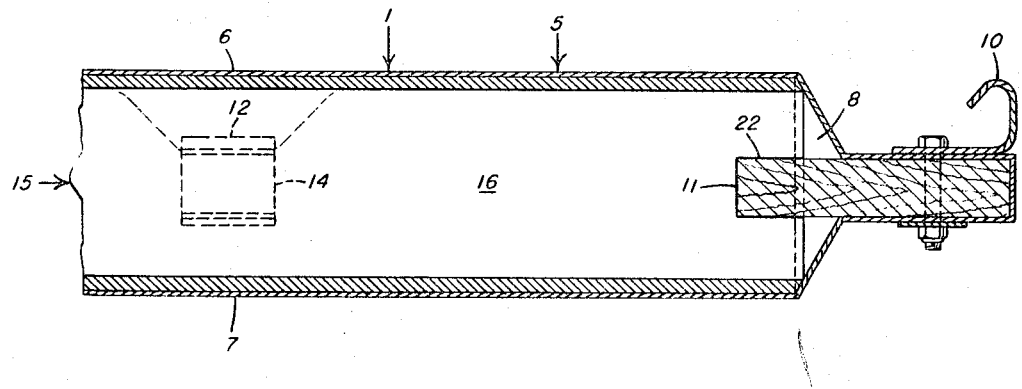
FIG. 5 is a fragmentary vertical sectional view on the scale of FIG. 3, taken along lines 5—5 of FIG. 1.
Figure 6:
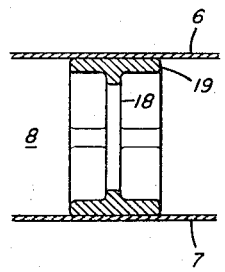
FIG. 6 is a fragmentary vertical sectional view taken along lines 6—6 of FIG 3.

Referring now in detail to the drawings in which like reference characters designate like parts, the improved fiber glass hatch cover of the present invention, designated as 1, is designed to close a hatch 2 in a roof 3 of a covered railway hopper car (not otherwise shown) and to be hinged to the roof at a side of the hatch for swinging, pivoting or hinging vertically and laterally about a longitudinally extending horizontal axis between positions to open and close the hatch. While permissively of other shapes, both the hatch 2 and the cover 1 will usually be oblong with the elongation longitudinal of the roof 3 and the hatch centered laterally between walkways 4, against one of which at its hinged side the cover rests in its open position. The hatch cover 1 is adapted to cover either an individual hatch or a section of a continuous hatch, depending on whether in the particular installation, the hatch 2 is a continuous hatch extending substantially the length of the car or a series of individual hatches so extending.

Like those disclosed in the Ingram applications, the hatch cover 1 of the present invention has a hollow body 5 formed of separately molded upper or top and lower or bottom fiber glass panels 6 and 7, respectively, joining or meeting and bonded together along their marginal edges, perimeters or longitudinal and lateral extremities, and, therebetween, spaced and bounding the body's hollow interior 8. As in the Ingram applications, the term "fiber glass," as used herein with reference to the panels and other parts of the improved hatch cover, has its now common meaning for glass fiber-reinforced plastic, with the preferred plastic an exothermally setting resin. The body 5 terminates at the sides or laterally in downturned side flanges 9 and on its ends mounts rain deflectors 10 upstanding from the upper panel 6 and backed in their mountings by laterally extending end spacer blocks of wood or other suitable material, seated or positioned between the panels in the end portions of the hollow interior 8. The hardware on the body 5 is completed by a pair of longitudinally spaced hinge butts or straps 12 and a locking or hold-down tongue, bracket or strap 13 mounted on the upper panel 6 at its hinge and distal sides, respectively, and each backed interiorly of the body 5 by a wooden or other suitable filler block 14.

As opposed to the hatch covers of the Igram applications, the lower, as well as the upper, of the panels 6 and 7 is double-sloping with its slope upwardly toward either side, so that the body 5 is generally diamond-shaped or rhombic in cross section with its maximum height at the center and tapering therefrom toward either side and the portions of the panels at each side of the center oblique and inclined or sloping and converging outwardly toward each other. This cross-sectional shape is particularly suited to accommodate the preferred internal reinforcing structure 15, which, in this case, internally reinforces the body 5 both longitudinally and laterally. Skeletal, the reinforcing structure 15 has, as its principal components, a center or central, longitudinal or longitudinally extending, preferably cylindrical fiber glass tube 16, extending substantially the length of the body 5 along and centered on the body's longitudinal centerline and a plurality of longitudinally spaced pairs of laterally aligned fiber glass ribs or wings 17 extending or outstanding laterally or radially from opposite sides of the center tube substantially to the body's sides. Seated or received at the point of maximum height in the center of the hollow interior 8, the longitudinally extending center tube 16 is of an outside diameter to span or bridge the space between and engage or bear against the inner faces of and back the top and bottom panels along the body's longitudinal centerline. Suitably of I-section with a connecting web 18 apertured for lightness and bounded by and integral with a peripheral or perimetrical flange 19, each rib 17 is outwardly tapered at the sides in conformance or correspondence with the outward taper or convergent slope or inclination of the top and bottom panels 6 and 7 toward either side of the body 5 and its wider inner end confronting the center tube 16 has a cylindrically concave socket or pocket 20 concentric and coradial with or conforming in contour to the outside of the tube for surface engagement therewith. Outwardly, each rib 17 preferably extends beyond the area of contact of the body 5 with the upstanding roof flange 21 bounding the adjoining side of the hatch 2, for backing the lower panel 7 at intervals over that area.

Engaged at opposite sides by the pairs of laterally aligned ribs 17, the center tube 16 will be positioned thereby centrally of the body 5 and, to serve as the longitudinal reinforcement for the body, need not be bonded either thereto or to the ribs. However, it is desirable that the ribs 17 be bonded along their sides to the upper and lower panels 6 and 7, and such bonding is necessary for proper poitioning or location of the ribs within the body, if the ribs and body are not previously bonded to each other for installation during assembly of the hatch cover as a unitary subassembly. Although the tube 16 is not necessarily bonded to the ribs 17, the longitudinal reinforcement provided mainly by the tube can be and preferably is extended to the ends of the body 5 by rigidly connecting or locking each end of the tube to the adjoining end filler or spacer block 11. For that purpose, each of the tube ends is interrupted by a radially or laterally extending, end-opening slot 22 for receiving or seating an adjoining side of and laterally passing the adjoining or contiguous end block and the tube and block are bonded together along the joint therebetween. Not only does this construction extend the longitudinal reinforcement of the body 5 to its ends, but the rigid connection between the tube and the end blocks also increases the lateral strength and resistance to relative twisting of the ends of the body.

In constructing the improved hatch cover 1, the top and bottom panels 6 and 7, center tube 16 and ribs 17 will be molded separately and thereafter assembled, conveniently with the lower panel still in its mold. In the assembly the end blocks 13 after bonding to the ends of the tube 16, will be placed therewith on the then upwardly facing inside of the lower panel and, if the ribs 17 are not also prebonded to the tube, the end blocks will act as jigs to hold the tube in place and, therethrough, facilitate positioning of the ribs. After the other filler blocks 14 have been positioned on the lower panel and the resin of the fiber glass or other suitable bonding agent or adhesive has been applied to the surfaces to be bonded together, including, if desired, the confronting surfaces of the tube and the ribs and panels, the upper panel 6 will be applied, whereafter the hatch cover will be completed by installing the external hardware or fittings.

When the assembled hatch cover is mounted on a car at a side of the related roof hatch 2, the lateral reinforcement provided at the ends by the end blocks 11 and, therebetween, by the ribs 17, will be supplemented by the laterally extending metal hinge butts 12 and hold-down tongue 13 and related filler blocks 14 and this supplemental reinforcement, as well as the mounting of the hardware, will be particularly effective if the hinge butts and tongue are held in place by bolting each to the body therethrough and the intervening filler block 14 and also through a metal bearing plate 23 bearing against the underside of the bottom panel. Consequently, some of the lateral ribs that otherwise would be necessary can be dispensed with. Thus, for the roof hatch of the now usual length of about thirteen feet having a triple-hinge mounting with one middle or longitudinally centered hinge butt 12 and a pair of outer hinge butts spaced longitudinally therefrom toward the opposite ends of the body 5 and the locking tongue 13 aligned laterally with the middle, instead of pairing each rib 17 with another, one rib can be paired with each of the outer hinge butts. As in the illustrated embodiment, it is then possible to complete the lateral reinforcement and position the center tube 16, if loose intermediate its end,s by but two pairs of laterally aligned ribs 17 each between and spaced longitudinally from the middle and one of the outer hinge butts.

Reinforced longitudinally by the center tube 16 and laterally in part by the several fittings and their backings, but mainly by the ribs 16, the improved hatch cover is as proof against bending or twisting as the now outmoded heavy steel hatch covers and, without much change in weight, could use relatively thin sheet metal instead of fiber glass for its upper and lower panels 6 and 7. However, a fiber glass skin ordinarily will be preferred not only for its exceptional strength but also for its resistance to corrosion.

From the above detailed description, it will be apparent that there has been provided an improved fiber glass hatch cover which is both reinforced longitudinally and laterally in the main by internal reinforcement. It should be understood that the described and disclosed embodiment is merely exemplary of the invention and that all modifications are intended to be included that do not depart from the spirit of the invention.

Having now described our invention, we claim:

1. A hatch cover for a roof hatch of a railway hopper car comprising a hollow body, and a reinforcing structure internal of said body, said structure including a center fiber glass tube extending longitudinally of and centered laterally on said body and fiber glass rib means outstanding laterally from said tube respectively for longitudinally and laterally reinforcing said body, certain of said rib means being on opposite sides of and spaced laterally by said tube.

2. A hatch according to claim 1, wherein the body is formed of separately molded upper and lower fiber glass panels peripherally bonded together.

3. A hatch cover according to claim 2, wherein rib means including a plurality of pairs of laterally aligned ribs spaced laterally by and embracing and outstanding laterally from opposite sides of the tube.

4. A hatch cover according to claim 3, wherein the reinforcing structure includes end filler blocks inside and extending laterally of opposite ends of the body, and each of said end blocks is received in and bonded to an adjoining end of the tube.

5. A hatch cover according to claim 4, wherein each panel at each side of a longitudinal centerline of the body slopes outwardly toward the other panel, the tube is a cylindrical tube extending along said centerline to and longitudinally overlapping the end blocks and extending between and engaging confronting inner faces of the panels, and each rib has sides sloping outwardly in correspondence with and engaging and bonded to inner faces of the panels on the same side of the centerline.

6. A hatch cover according to claim 5, wherein each rib has at an inner end thereof a cylindrically concave socket receiving and conforming to an adjoining side of the tube and extends outwardly therefrom beyond an area of said body bearing in closed position against an adjoining side of the hatch.

7. A hatch cover according to claim 6, wherein each rib is of I-section with a peripheral flange bounding an aperture-lightened connecting web.

8. A hatch cover according to claim 6, wherein the hatch cover is hinged to a roof of the car at a side of the hatch by a plurality of hinge butts mounted in longitudinally spaced relation on an outside of the upper panel at one side of and extending laterally inwardly toward the body's centerline, each hinge butt is backed by and bolted through a filler block inside the body, and the reinforcing structure includes a plurality of laterally extending fiber glass ribs, each laterally aligned with one of said hinge butts and in the opposite side of the body therefrom.

9. A hatch cover according to claim 8, wherein the hinge butts include a middle hinge butt centered longitudinally on the body and a pair of outer hinge butts on opposite sides of and spaced longitudinally from said middle hinge butt, the rib-aligned hinge butts are the outer hinge butts, and including a laterally extending hold-down tongue backed internally of the body by a filler block and laterally aligned with said middle hinge butt and mounted in and on an opposite side of the body.

10. A hatch cover according to claim 4, wherein the tube is bonded only to the end blocks.

11. A hatch cover according to claim 4, wherein the tube is bonded to both the end blocks and the ribs and forms therewith a unitary subassembly.

References Cited

UNITED STATES PATENTS

| | | | |
|---|---|---|---|
| 2,927,354 | 3/1960 | Laver | 49—501 X |
| 2,970,347 | 2/1961 | Massopust | 49—401 X |
| 3,031,013 | 4/1962 | Russell | 160—236 X |
| 3,429,083 | 2/1969 | Voros | 52—53 |

DAVID J. WILLIAMOWSKY, Primary Examiner

P. C. KANNAN, Assistant Examiner

U.S. Cl. X.R.

52—19, 615